(12) United States Patent
Wei et al.

(10) Patent No.: US 11,584,172 B2
(45) Date of Patent: *Feb. 21, 2023

(54) ATTACHMENT MECHANISM FOR TIRE-MOUNTED SENSORS

(71) Applicant: Bridgestone Americas Tire Operations, LLC, Nashville, TN (US)

(72) Inventors: Terence E. Wei, Copley, OH (US); Thomas A. Sams, Alliance, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/118,066

(22) Filed: Dec. 10, 2020

(65) Prior Publication Data

US 2021/0094367 A1 Apr. 1, 2021

Related U.S. Application Data

(63) Continuation of application No. 15/780,679, filed as application No. PCT/US2016/064177 on Nov. 30, 2016, now Pat. No. 10,894,451.

(Continued)

(51) Int. Cl.
*B60C 23/04* (2006.01)
*B29D 30/00* (2006.01)

(52) U.S. Cl.
CPC ...... *B60C 23/0493* (2013.01); *B29D 30/0061* (2013.01); *B29D 2030/0072* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002

See application file for complete search history.

(56) References Cited

U.S. PATENT DOCUMENTS 6,217,683 B1 4/2001 Balzer
6,386,251 B1 5/2002 Koch
(Continued)

FOREIGN PATENT DOCUMENTS

DE 102005024256 11/2006
EP 2777958 8/1988
(Continued)

OTHER PUBLICATIONS

International Search Report and Written Opinion; Corresponding PCT Application Serial No. PCT/US2016/064177; Authorized Officer Chang Ho Lee; dated Mar. 17, 2017.
(Continued)

*Primary Examiner* — Andre J Allen (57) ABSTRACT

An assembly for mounting an electronics package to a tire includes an electronics package, a mount with a peripheral flange, and an attachment patch. The electronics package is connected to the mount, which is in contact with the tire. The attachment patch is connected to the mount and includes a central opening that it smaller than the peripheral flange. The attachment patch is further affixed to the tire.

20 Claims, 5 Drawing Sheets

Related U.S. Application Data (60) Provisional application No. 62/267,493, filed on Dec. 15, 2015.

(56) References Cited

U.S. PATENT DOCUMENTS

| | | | |
|---|---|---|---|
| 6,546,982 | B1 | 4/2003 | Brown et al. |
| 6,885,291 | B1 | 4/2005 | Pollack et al. |
| 7,900,665 | B2 | 3/2011 | Shimura et al. |
| 8,226,783 | B2 | 7/2012 | Shimura et al. |
| 8,237,553 | B2 | 8/2012 | Wilson et al. |
| 8,266,465 | B2 | 9/2012 | Hardman et al. |
| 8,511,156 | B2 | 8/2013 | Kutzscher et al. |
| 8,596,117 | B2 | 12/2013 | Wilson et al. |
| 8,776,590 | B2 | 7/2014 | Kempf |
| 8,984,936 | B2 | 3/2015 | Brusarosco et al. |
| 9,016,118 | B2 | 4/2015 | Townsend et al. |
| 9,016,339 | B2 | 4/2015 | Tanno et al. |
| 9,022,086 | B2 | 5/2015 | Tanno et al. |
| 2002/0046791 | A1 | 4/2002 | Rensel |
| 2008/0216566 | A1 | 9/2008 | Vickery |
| 2009/0058667 | A1 | 3/2009 | Dixon |
| 2009/0173422 | A1 | 7/2009 | Utsumi et al. |
| 2009/0266153 | A1 | 10/2009 | Hironaka |
| 2009/0320580 | A1 | 12/2009 | Mancosu et al. |
| 2011/0315292 | A1 | 12/2011 | Gougnaud |
| 2012/0298272 | A1 | 11/2012 | Tanno et al. |
| 2012/0300809 | A1 | 11/2012 | Weston |
| 2013/0160919 | A1 | 6/2013 | Hinque |
| 2014/0261944 | A1 | 9/2014 | Papakonstantopoulos |
| 2014/0360019 | A1 | 12/2014 | Brusarosco et al. |
| 2016/0052352 | A1 | 2/2016 | Chandra |
| 2017/0057307 | A1 | 3/2017 | Benedict |
| 2017/0059435 | A1 | 3/2017 | Marques |

FOREIGN PATENT DOCUMENTS

| | | |
|---|---|---|
| EP | 3168068 | 5/2017 |
| WO | 0047430 | 8/2000 |
| WO | 2017105842 | 6/2017 |

OTHER PUBLICATIONS

TMS Tire Monitor System; http://www.ambromley.co.uk/tms/; accessed on Jul. 6, 2015.

Cyber Fleet; http://www.pirelli.com/mediaObject/pirellityre/ww/en/extra-catalogue/truck/fleet_solutions/CyberFleet_Flotte_EN/original/CyberFleet_Flotte_EN.pdf; accessed on Jul. 6, 2015.

Phil Kinnane; Piezoelectric Energy Harvester Helps Increase a Car's Efficiency; https://www.comsol.com/blogs/piezoelectric-energy-harvester-increases-car-efficiency/; Jul. 26, 2012.

Stephen Williams; Smarter Sensor for Tire Monitors; http://www.nytimes.com/2010/12/12/automobiles/12TIRE.html?_r=0; Dec. 10, 2010.

Callan Feargel, Supplementary European Search Report, Aug. 8, 2019, pp. 1-7, European Patent Office, Munich Germany.

ATTACHMENT MECHANISM FOR TIRE-MOUNTED SENSORS

CROSS-REFERENCE TO RELATED APPLICATIONS

This application is a continuation of U.S. patent application Ser. No. 15/780,679 filed on Jun. 1, 2018, which in turn is a national stage entry of PCT/US2016/064177, filed on Nov. 30, 2016, which in turn claims the benefit of priority of U.S. Provisional Application No. 62/267,493, filed on Dec. 15, 2015, each of which is incorporated herein by reference in its entirety.

FIELD OF INVENTION

The present disclosure relates to devices for attaching a tire-mounted sensor ("TMS") package to an innerliner of a tire. More specifically, the present disclosure relates to novel attachment components for affixing differently shaped TMS packages to an innerliner of a tire.

BACKGROUND

Mounting devices are used to attach objects to a tire, and particularly to an innerliner of a tire. One application is to attach a TMS package to the innerliner of a tire. Various fasteners are used to connect the TMS package to the innerliner, including hook and loop fasteners, threaded connectors, clamps, pins, and snap-fit structures. Such fasteners, however, do not provide a robust and secure connection while maintaining the ability to remove the TMS package.

SUMMARY OF THE INVENTION

In one embodiment, an assembly for mounting an electronics package to a tire includes an electronics package having a main portion. The assembly further includes a mount. The mount includes a peripheral flange. An attachment patch is configured to be connected to the mount. The attachment patch has a central opening that extends completely through the attachment patch. The central opening of the attachment patch is smaller than the peripheral flange of the mount. The attachment patch is configured to be directly affixed to a tire.

In another embodiment, an assembly for attaching a tire-mounted sensor package to an innerliner of a tire includes a tire-mounted sensor package containing electronics. The tire-mounted sensor package includes a clamp having at least one arm. The assembly further includes a mount having a bottom flange portion and an elongated post extending from the bottom flange portion. The bottom flange portion is wider than the elongated post. The bottom flange portion is adapted to be affixed to an innerliner of a tire. The at least one arm of the clamp engages the elongated post of the mount to attach the tire-mounted sensor package to the mount.

In yet another embodiment, a method of attaching an electronics package to a tire includes locating an electronics package mount against a tire. The electronics package mount has a lower flange. The method further includes placing an attachment patch over the electronics package mount so that at least a contact portion of the attachment patch is in contact with the tire. The attachment patch includes a central cutout portion that is smaller than the lower flange of the electronics package mount, the central cutout portion extending completely through the attachment patch. The method further includes permanently affixing the contact portion of the attachment patch to the tire, and affixing an electronics package to the electronics package mount.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

An "innerliner," as used herein, refers to an impervious surface that is the innermost interior surface of the tire cavity. Both singular and plural forms of this term may be within the definitions.

Figure 1A:
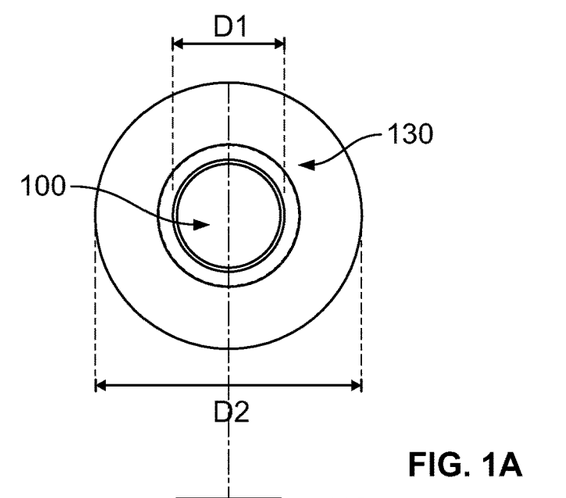
FIG. 1A is a top view of an embodiment of a TMS package with an integral flange, and an accompanying attachment patch.
Figure 1B:
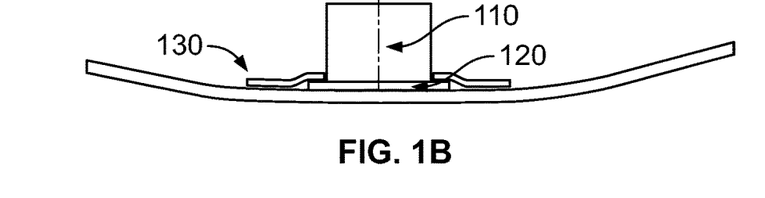
FIG. 1B is a cross section side view of the embodiment shown in FIG. 1A.

FIGS. 1A and 1B show a TMS package (also referred to as an electronics package) 100 having a main portion 110 and a mount 120 located at a bottom of the main portion 110. In this embodiment, the mount 120 takes the form of a circular flange and is integral with the main portion 110 of the TMS package. The TMS package 100 contains various sensors and communications equipment that is capable of measuring various tire-related metrics. Such metrics include but are not limited to pressure, temperature, humidity, repeated large amplitude strain in the tire, rubber aging, tread depth, road conditions, tire health, etc.

The TMS package 100 includes an outer casing that encloses the sensors and communications equipment. TMS package 100 further may have one or more openings (not shown) in the main portion 110, so that air pressure measurements can be taken by the electronics. In one embodiment, the TMS package 100 includes a sensor for measuring an internal temperature of a tire and a transmitter device, such as a radio frequency transmitter. In an alternative embodiment, the TMS package 100 includes a sensor for measuring an internal pressure of a tire and a transmitter device. In another alternative embodiment, the TMS package 100 includes one or more sensors for measuring both an internal temperature and an internal pressure of a tire, as well as a transmitter device. In other alternative embodiments, the TMS package 100 may include accelerometers, stress gauges, strain gauges, sensors for counting tire revolutions, temperature sensors for measuring a temperature of tire materials, sensors for measuring tread depths, or any other known sensors. The TMS package 100 may also include identification information.

In this embodiment, main portion 110 is cylindrical in shape, and mount 120 is a circular flange. In alternative embodiments (not shown), the TMS package 100 can take any geometric shape. For example, the TMS package main portion 110 could be formed as a hexagonal or octagonal prism. Further, TMS package main portion 110 could be oblong, so that the cross section would resemble a stretched-out circle, oval, hexagon, octagon, etc. Mount 120 could take the same shape as the main portion 110. In other alternative embodiments (not shown), the mount 120 and main portion 110 could take different shapes. The attachment patch 130 could likewise take the form of hexagonal, octagonal, polygonal, or other shapes. In all embodiments, the attachment patch 130 has a size and shape that is larger than the mount 120 of the TMS package 100, and the patch has an opening of a size and shape that can receive the TMS package.

Mount 120 has a diameter larger than the diameter of main portion 110, and main portion 110 is centered on mount 120. In an alternative embodiment (not shown), the main portion is off-center relative to the mount. In other alternative embodiments (not shown), the mount 120 and main portion 100 could take different shapes. The attachment patch 130 and attachment patch opening could likewise take the form of hexagonal, octagonal, polygonal, or other shapes. In all embodiments, the attachment patch 130 has a size and shape that is larger than the mount 120 of the TMS package main portion 110, and the attachment patch has an opening of a size and shape that can receive the TMS package main portion 110.

Attachment patch 130 is further provided to affix the TMS package 100 to the innerliner of a cured tire. Attachment patch 130 is constructed of a resilient material, such as rubber or other elastomeric material. In one embodiment, the attachment patch 130 is constructed of the same rubber composition as the innerliner of the tire. It should be understood that the attachment patch 130 may be constructed of any thermoplastic or thermoset, including without limitation, neoprene, butyl, TPU, EPDM. An attachment patch for tires used in severe use environments, such as high temperatures, high speeds, or high strains, may require a different rubber composition than an attachment patch for tires used in milder environments or cold weather environments.

Attachment patch 130 includes an inner diameter D1 and an outer diameter D2. D1 is substantially equal to the diameter of main portion 110 of TMS package 100. D1 is less than the diameter of the mount 120. D2 is greater than the diameter of the mount 120. Due to the relative size of the diameters, attachment patch 130 fits over the top of TMS package 100, and contacts both the top of mount 120 and the innerliner of the tire. Attachment patch 130 is then permanently affixed onto the innerliner of the tire using an adhesive or with a cold cure process. When an adhesive is used, first the adhesive is applied to the bottom of the attachment patch 130, and then the attachment patch 130 is placed in contact with the innerliner of the tire. Alternatively, the adhesive could be applied to the innerliner alone, or to both the innerliner and the attachment patch 130.

In the instance where cold curing is used, the attachment patch 130 is first placed over the TMS package 100, and then cold cured to the tire innerliner. To cold cure the attachment patch 130 to an innerliner of the tire, heat and pressure are applied to the attachment patch 130 where it contacts the tire innerliner, so that the two surfaces fuse together. The result is a permanent bond between the attachment patch 130 and the tire innerliner, which securely holds the TMS package 100 against the innerliner of the tire.

In one embodiment, the TMS package 100 can be affixed to the innerliner of a tire on a sidewall portion of a tire. In another embodiment, the TMS package 100 can be affixed to the innerliner of the tire under the belt area of the tire. In yet another embodiment, the TMS package 100 can be affixed to the innerliner of the tire in a shoulder region of the tire. In still another embodiment, the TMS package 100 can be affixed to the innerliner of the tire in the bead region of the tire.

The affixation position may be selected based on properties of a specific tire type. For example, a tire may be tested to determine stresses, strains, vibrations, temperatures, and other characteristics at various locations during operation of the tire. A location with minimal stresses and strains may be a desirable affixation position, because such a location will minimize the stresses put on the mounting apparatus. Alternatively, a location with maximum stresses and strains may be a desirable affixation position, because an operator may wish to monitor a tire at a location where it is most likely to fail if operating conditions are too severe. Other desirable affixation positions will be apparent to those skilled in the art and include those positions at which an electronic device may transmit a signal to a receiver, without damage to the tire, the electronic device, or the mounting apparatus. The affixation location in the belt area may be a desirable location if the belt does not interfere with transmission.

In one embodiment, the TMS package 100 is affixed to the innerliner of a green tire at a desired location, and the attachment patch 130 is cured with the tire. The material of the attachment patch 130 will bond with the rubber of the innerliner during curing. Additionally, or in the alternative, an adhesive may be used to mount the innerliner to the green tire, prior to curing.

In an alternative embodiment, the TMS package 100 is affixed to the innerliner of a cured tire. In one such embodiment, an uncured attachment patch 130 is affixed to the innerliner of a tire using a dual cure cement or dual care gum. Alternatively, other cements, gums, or adhesives may be used to bond the attachment patch 130 to the innerliner. In another alternative embodiment (not shown), the TMS package 100 may be separable into a lower component and an upper component, wherein the lower component is cured with the tire innerliner, and the upper component is affixed to the lower component after the tire has been cured.

Figure 2A:
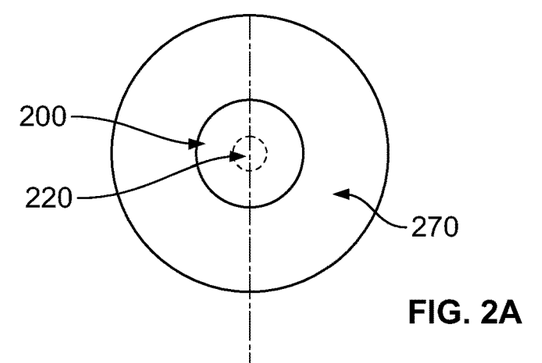
FIG. 2A is a top view of another embodiment of a TMS package having a through hole, a mount, and an accompanying attachment patch.
Figure 2B:
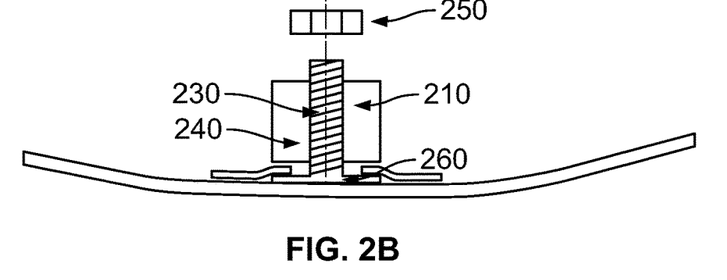
FIG. 2B is a cross section side view of the embodiment shown in FIG. 2A.

FIGS. 2A and 2B show a TMS package 200 that includes a main portion 210 connected to a mount 220. Aside from the differences discussed below, the TMS package 200 is substantially the same as the TMS package 100 discussed above in relation to FIGS. 1A-1B. Specifically, the TMS package 200 may include the same electronics as TMS package 100, including any of the alternatives discussed above. Likewise, the TMS package 200 may have substantially the same geometry as TMS package 100, or any of the alternative geometries discussed above.

Mount 220 includes a threaded post 230 in a center thereof, and extending substantially perpendicularly to the tire innerliner. The main portion 210 of the TMS package 200 contains a through-hole 240 with a diameter corresponding to the threaded post 230. When the TMS package main portion 210 is installed onto the mount 220, the threaded post 230 extends through the through hole 240 and out of the top of main portion 210. A nut 250 is screwed on to the top of the threaded post 230 to hold the TMS package main portion 210 in place against the mount 220. In an alternative embodiment (not shown), the TMS package main portion 210 includes a threaded hole instead of a through hole, and the main portion 210 screws onto the threaded post 230 via the threaded through hole. In another alternative embodiment (not shown), the TMS package main portion 210 includes a plurality of threaded holes that correspond to a plurality of threaded posts 230.

Mount 220 further includes a flange 260 substantially similar to the mount 120 discussed above with respect to FIGS. 1A and 1B, including the alternative embodiments.

Attachment patch 270 is substantially similar to the attachment patch 130 discussed above with respect to FIGS. 1A and 1B, including the alternative embodiments. The central opening of the attachment patch 270 is smaller than the diameter of the flange 260.

The mount 220 and attachment patch 270 are installed using the same principles as discussed above with respect to FIG. 1. The TMS package main portion 210 can be installed onto the mount before or after the mount 220 and attachment patch 270 are installed into the tire innerliner. Further, with this embodiment, the TMS package main portion 210 can be removed after installation into the tire innerliner, by unscrewing nut 250 and removing main portion 210 from the mount 220. Attachment patch 270 affixes the mount 220 in the same manner as discussed above with respect to FIGS. 1A and 1B, including the discussed alternative embodiments.

Figure 3A:
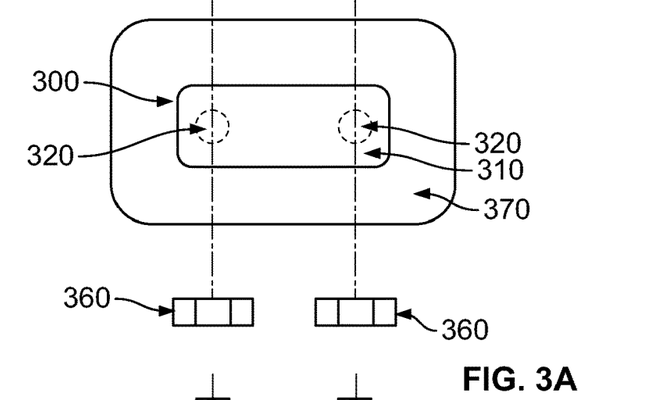
FIG. 3A is a top view of another embodiment of a TMS package having two through holes for receiving elongated posts of two mounts and an accompanying attachment patch.
Figure 3B:
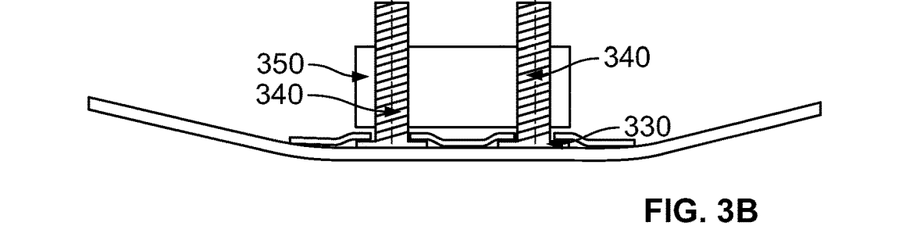
FIG. 3B is a cross section side view of the embodiment shown in FIG. 3A.

FIGS. 3A and 3B show a TMS package 300 that includes a main portion 310 connected to mounts 320. Aside from the differences discussed below, the TMS package 300 is substantially the same as the TMS package 100 discussed above in relation to FIGS. 1A-1B. Specifically, the TMS package 300 may include the same electronics as TMS package 100, including any of the alternatives discussed above. Likewise, the TMS package 300 may have substantially the same geometry as TMS package 100, or any of the alternative geometries discussed above. In this embodiment, TMS package main portion 310 is shaped as a rectangular prism.

Mounts 320 each include a flange 330 and a threaded post 340 that extend through through-holes 350 of the TMS package main portion 310. Nuts 360 secure the TMS package main portion 310 to the threaded posts 340, and prevent it from falling off of the threaded posts 340. In another alternative embodiment (not shown), multiple threaded posts 340 can all be affixed to a single mount having a single flange.

Attachment patch 370 includes two holes sized and shaped so that threaded posts 340 can pass through through-holes 350, but small enough so that flanges 330 cannot pass through. In this embodiment, attachment patch 370 takes a rectangular shape. In other embodiments (not shown), the attachment patch 370 and attachment patch opening could take the form of hexagonal, octagonal, polygonal, or other shapes. In all embodiments, the attachment patch 370 has a size and shape that is larger than the flange 330 of the mount 320, and the patch has an opening of a size and shape that can receive the mount 320. Attachment patch 370 affixes the mount 320 in the same manner as discussed above with respect to FIGS. 1A and 1B, including the discussed alternative embodiments.

In an alternative embodiment (not shown), three or more threaded posts 340 may be used to secure the TMS package 300. In another alternative embodiment (not shown), the TMS package 300 includes threaded holes instead of through-holes 350, and threaded posts 340 can be screwed into the threaded holes prior to installation of the TMS package 300 on tire innerliner.

Figure 4A:
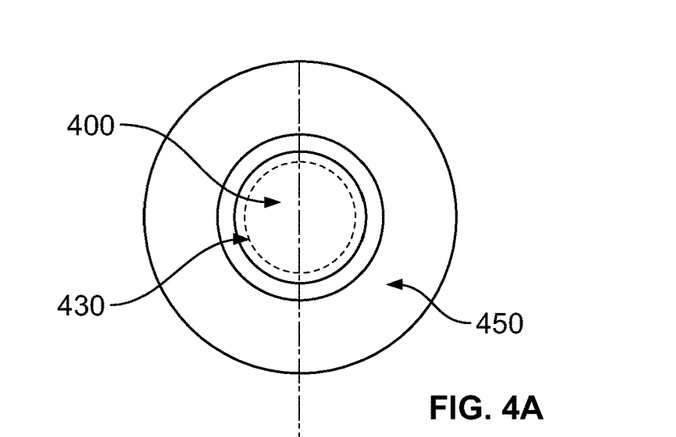
FIG. 4A is a top view of another embodiment of a TMS package having a groove that corresponds to a flange of a mount, and an accompanying attachment patch.
Figure 4B:
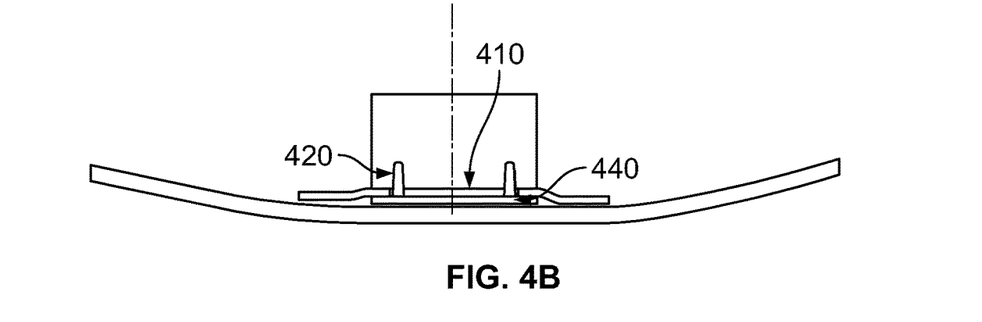
FIG. 4B is a cross section side view of the embodiment shown in FIG. 4A.

FIGS. 4A and 4B show a TMS package 400 affixed to a mount 410. Aside from the differences discussed below, the TMS package 400 is substantially the same as the TMS package 100 discussed above in relation to FIGS. 1A-1B. Specifically, the TMS package 400 may include the same electronics as TMS package 100, including any of the alternatives discussed above. Likewise, the TMS package 400 may have substantially the same geometry as TMS package 100, or any of the alternative geometries discussed above.

TMS package 400 includes a circular groove 430 that receives a circular flange 420 located on mount 410, thereby forming an interference fit. The circular flange 420 is angled slightly outward from a center of mount 410 to ensure a tight fit within circular groove 430 of TMS package 400. In alternative embodiments (not shown), the groove and flange could take any geometric shape, as long as they correspond to one another. For example, groove and flange could be square, hexagonal, trapezoidal, polygonal, zig-zag, parabolic, or any other shape. In other alternative embodiments (not shown), the groove and flange may have a plurality of discrete corresponding grooves and flanges that can take any shape. In further alternative embodiments (not shown), the flange 420 can be angled directly vertical from the mount 410, or alternatively angled inward toward a center of mount 410.

Mount 410 further includes a bottom flange 440 extending outward from a center of mount 410. The diameter of the bottom flange 440 is greater than the diameter of the circular flange 420.

Attachment patch 450 has a central opening with a diameter greater than or equal to the diameter of the circular flange 420, but less than the diameter of the bottom flange 440. Attachment patch 450 affixes the mount 410 in the same manner as discussed above with respect to FIG. 1, including the discussed alternative embodiments.

Figure 5A:
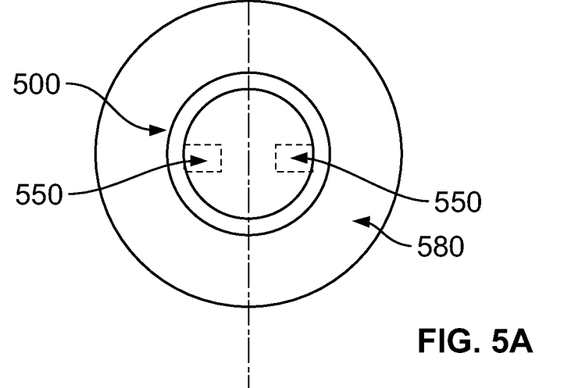
FIG. 5A is a top view of another embodiment of a TMS package mounted to a mount having two snaps.
Figure 5B:
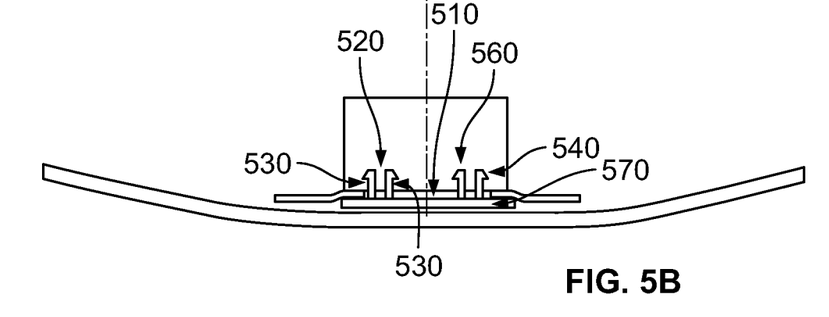
FIG. 5B is a cross section side view of the embodiment show in FIG. 5A.

FIGS. 5A and 5B show a TMS package 500 affixed to a mount 510 via snaps 520 located on mount 510. Aside from the differences discussed below, the TMS package 500 is substantially the same as the TMS package 100 discussed above in relation to FIGS. 1A-1B. Specifically, the TMS package 500 may include the same electronics as TMS package 100, including any of the alternatives discussed above. Likewise, the TMS package 500 may have substantially the same geometry as TMS package 100, or any of the alternative geometries discussed above.

Each snap 520 includes at least two flexible prongs 530, which each have a barb 540 on a top end thereof. Snaps 520 can be made of plastic or other flexible material that permits flexible prongs 530 to bend inwards when inserted into holes 550, and then return to a neutral position when barbs 540 reach the recessions 560 of holes 550. In alternative embodiments, flexible prongs 530 can be made from another any other material such as a metal or a composite. In an alternative embodiment (not shown), each snap 520 can have greater or fewer than two flexible prongs 530. In another alternative embodiment (not shown), the number of snaps 520 provided on mount 510 can be greater or fewer than two.

TMS package 500 includes holes 550 designed to mate with snaps 520. Holes 550 have recessions 560 at a top portion thereof. Holes 550 have a uniform diameter that is smaller than the diameter of recessions 560. Prongs 530 are flexible, and flex inwards when initially inserted into holes 550. Recessions 560 are sized and shaped to mate with barbs 540 of the snaps 520 when snaps 520 are fully inserted into the holes 550. In an alternative embodiment (not shown), a plurality of mounts are provided, similar to the mounts shown in FIGS. 3A-3B except with snaps instead of threaded posts.

Mount 510 includes a flange 570. Attachment patch 580 includes a central opening that has a diameter large enough so that snaps 520 can pass through. The central opening of the attachment patch 580 is but smaller than a diameter of flange 570. Attachment patch 580 affixes the mount 510 in the same manner as discussed above with respect to FIG. 1, including the discussed alternative embodiments.

Figure 6A:
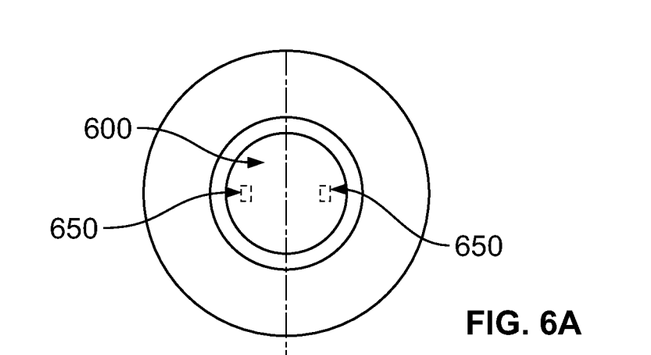
FIG. 6A is a top view of another embodiment of a TMS package having snaps mounted to a mount.
Figure 6B:
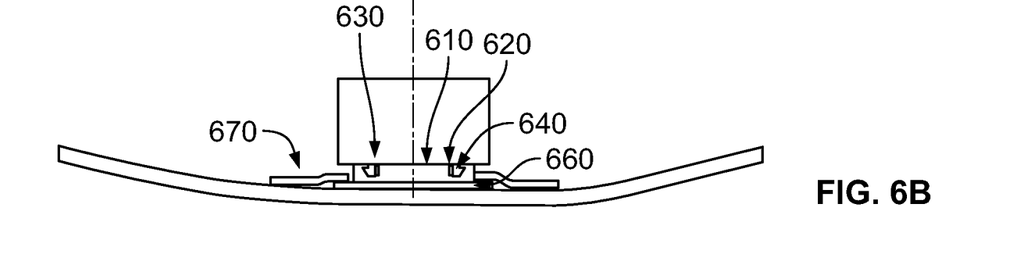
FIG. 6B is a cross section side view of the embodiment shown in FIG. 6A.

FIGS. 6A and 6B show a TMS package 600 affixed to a mount 610 via snaps 620 located on the TMS package 600. Aside from the differences discussed below, the TMS package 600 is substantially the same as the TMS package 100 discussed above in relation to FIGS. 1A-1B. Specifically, the TMS package 600 may include the same electronics as TMS package 100, including any of the alternatives discussed above. Likewise, the TMS package 600 may have substantially the same geometry as TMS package 100, or any of the alternative geometries discussed above.

TMS package 600 locks on to mount 610 when installed. Snaps 620 each consist of one prong 630 in this embodiment, and each prong 630 includes a barb 640 at a lower portion thereof. Mount 610 includes an upper portion having holes 650 sized and shaped to receive snaps 620. Mount 610 further includes flange 660, having a diameter wider than the diameter of the upper portion mount 610.

Snaps 620 can be made of plastic or other flexible material that permits flexible prongs 630 to bend inwards when inserted into holes 650 in the mount 610, and then return to a neutral position when barbs 640 reach recessions at the base of the holes 650. In alternative embodiments, prongs 630 can be made from another any other material such as a metal or a composite. In an alternative embodiment (not shown), each snap 620 can have greater or fewer than two prongs 630. In another alternative embodiment (not shown), the number of snaps 620 provided on mount 610 can be greater or fewer than two.

Attachment patch 670 includes a central opening with a diameter larger than the upper portion 650, but smaller than the diameter of flange 660. In alternative embodiments, attachment patch 670 can take the form of alternative shapes as discussed above with respect to FIGS. 1A and 1B.

Attachment patch 670 affixes the mount 610 in the same manner as discussed above with respect to FIGS. 1A and 1B, including the discussed alternative embodiments. Snaps 620 function in the same manner as discussed above with respect to FIGS. 5A and 5B, except that the locations of the snaps and corresponding holes are switched.

In an alternative embodiment (not shown), any number of snaps 620 and corresponding holes 650 may be provided. In another alternative embodiment (not shown), a plurality of mounts are provided, similar to the mounts shown in FIGS. 3A-3B except with holes for receiving snaps instead of threaded posts.

Figure 7A:
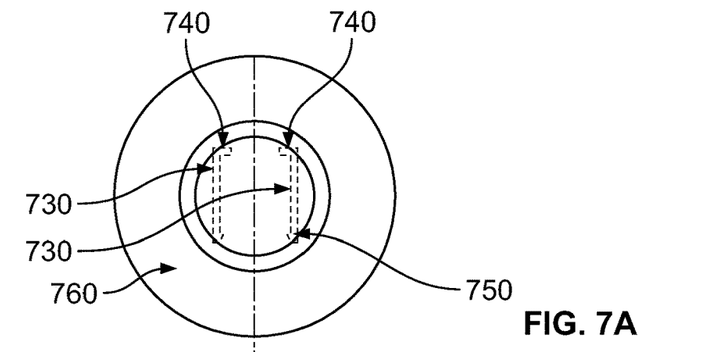
FIG. 7A is a top view of another embodiment of a TMS package having attachment rails attached to a mount having receiving rails.
Figure 7B:
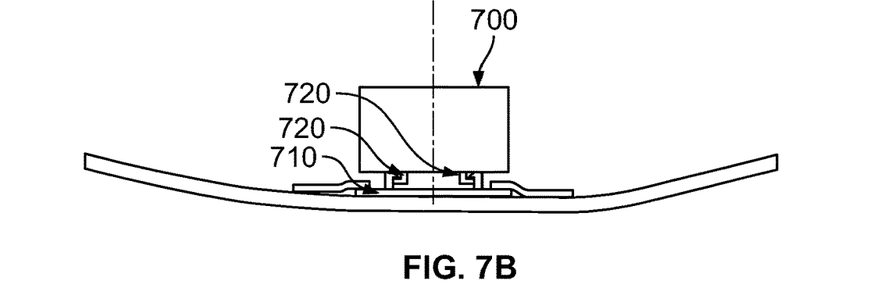
FIG. 7B is a cross section side view of the embodiment shown in FIG. 7A.

FIGS. 7A and 7B show a TMS package 700 affixed to a mount 710 via attachment rails 720 located on the TMS package 700 that fit into receiving rails 730 located on the mount 710. Aside from the differences discussed below, the TMS package 700 is substantially the same as the TMS package 100 discussed above in relation to FIGS. 1A-1B. Specifically, the TMS package 700 may include the same electronics as TMS package 100, including any of the alternatives discussed above. Likewise, the TMS package 700 may have substantially the same geometry as TMS package 100, or any of the alternative geometries discussed above.

Attachment rails 720 are located on a lower portion of TMS package 700, and have L-shaped cross sections. In this embodiment, attachment rails 720 are parallel to one another, and are mirror images of one another. In other embodiments (not shown), the attachment rails 720 can take any other shape, including shapes that are non-symmetrical between rails.

The two receiving rails 730 on the mount 710 have L-shaped cross sections that mate with attachment rails 720 of the TMS package 700. The receiving rails 730 further include stops 740 at their front ends and barbs 750 at their rear ends. Receiving rails 730 are further flexible at the rear ends, so that the rear ends of receiving rails 730 can flex outwardly when attachment rails 720 are slid into a locking engagement with receiving rails 730. When attachment rails 720 are slid into receiving rails 730 until the attachment rails 720 contact stops 740, rear barbs 750 snap into place around attachment rails 720 to prevent attachment rails 720 from sliding out of locked engagement with mount 710. Receiving rails 730 can be permitted to flex by not attaching receiving rails 730 to mount at a rear portion.

Attachment patch 760 affixes the mount 710 in the same manner as discussed above with respect to FIGS. 1A and 1B, including the discussed alternative embodiments. Attachment patch 760 in this embodiment takes the shape of a ring, similar to the attachment patch 130 discussed above with respect to FIGS. 1A and 1B including the discussed alternative embodiments. In alternative embodiments, attachment patch 760 can take the form of alternative shapes as discussed above with respect to FIGS. 1A and 1B including the discussed alternative embodiments.

In an alternative embodiment (not shown), the locations of the attachment rails and receiving rails can be switched. In a further alternative embodiment (not shown), the cross sections of the attachment rails, receiving rails, or both, can take different shapes. In another alternative embodiment (not shown), any number of receiving and attachment rails can be provided.

Figure 8A:
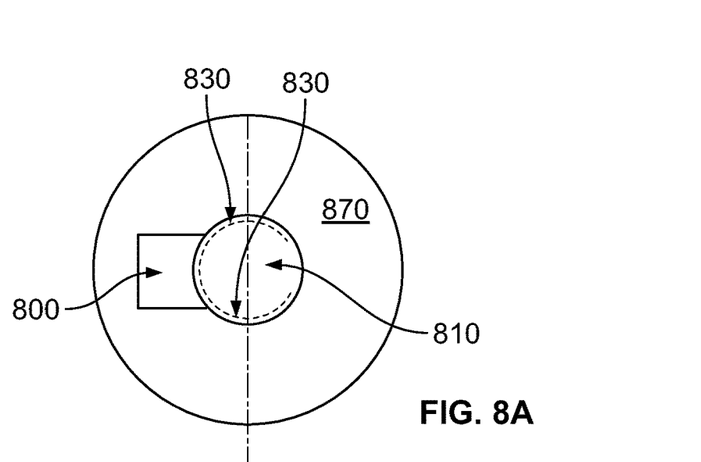
FIG. 8A is a top view of another embodiment of a TMS package having a clamp attached to a mount having an elongated post and a separate attachment patch.
Figure 8B:
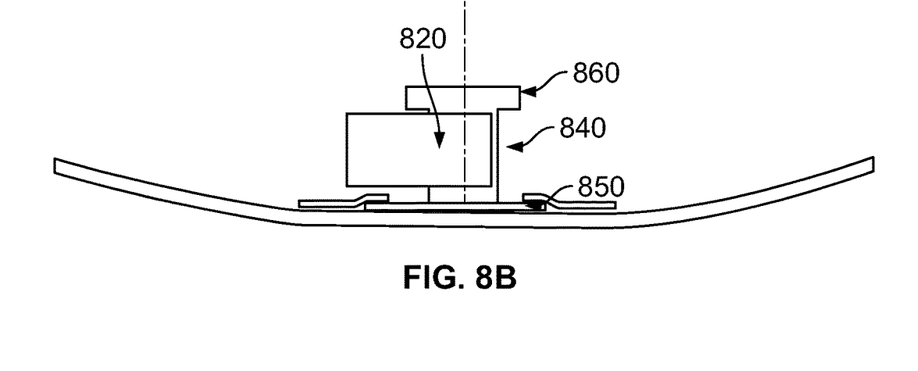
FIG. 8B is a cross section side view of the embodiment shown in FIG. 8A.

FIGS. 8A and 8B show a TMS package 800 affixed to a mount 810 via a clamp 820. Aside from the differences discussed below, the TMS package 800 is substantially the same as the TMS package 100 discussed above in relation to FIGS. 1A-1B. Specifically, the TMS package 800 may include the same electronics as TMS package 100, including any of the alternatives discussed above. Likewise, the TMS package 800 may have substantially the same geometry as TMS package 100, or any of the alternative geometries discussed above.

TMS package 800 in this embodiment is integral with clamp 820. Clamp 820 has two flexible arms 830. In this embodiment, flexible arms 830 form a partial circle. In an alternative embodiment (not shown), flexible arms 830 could have any other geometry. In another alternative embodiment (not shown), clamp 820 can include greater or fewer than two flexible arms 830. In another alternative embodiment (not shown), clamp 820 can be separate from TMS package 800, and can be fastened to TMS package via a fastener such as snaps or slots. Clamp 820 can be made from the same or a different material as the rest of TMS package 800. Exemplary materials for clamp 820 include but are not limited to plastic, a plastic composite, metal, or any other flexible material.

Mount 810 includes an elongated post 840, a lower flange 850, and an upper flange 860. Elongated post 840 in this embodiment takes the form of a cylinder. In an alternative embodiment (not shown), elongated post 840 could take the form of any other shape. In all embodiments, the shape of elongated post 840 will match the geometry of the flexible arms 830.

To install TMS package 800 on mount 810, the clamp 820 is pushed into place around elongated post 840 so that flexible arms 830 flex outwardly around elongated post 840, and then return to the position shown in FIG. 8A, when the flexible arms 830 encircle elongated post 840. This tight interface fit between clamp 820 and elongated post 840 secures the TMS package 800 against mount 810. Upper flange 860 has a diameter greater than an inner diameter of the clamp 820 and prevents TMS package 800 from sliding off of the elongated post 840.

Attachment patch 870 affixes the mount 810 in the same manner as discussed above with respect to FIGS. 1A and 1B, including the discussed alternative embodiments. Attachment patch 870 in this embodiment takes the shape of a ring, similar to the attachment patch 130 discussed above with respect to FIGS. 1A and 1B including the discussed alternative embodiments. In alternative embodiments, attachment patch 870 can take the form of alternative shapes as discussed above with respect to FIGS. 1A and 1B including the discussed alternative embodiments.

Figure 9A:
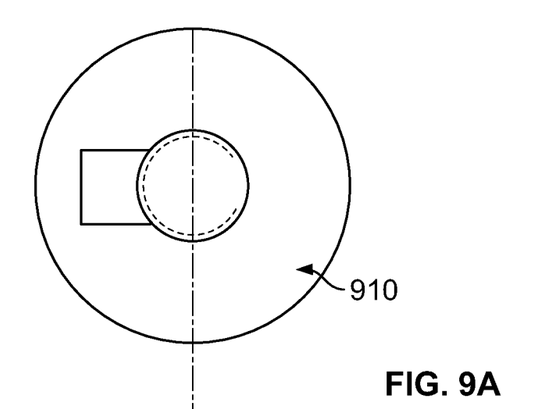
FIG. 9A is a top view of another embodiment of a TMS package having a clamp attached to a mount having an elongated post and an integral attachment patch according to the present disclosure.
Figure 9B:
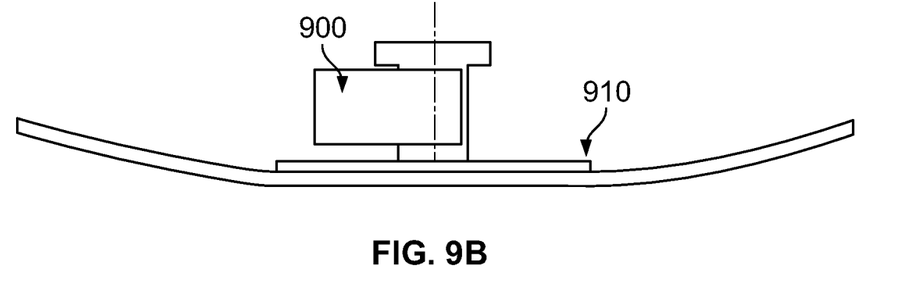
FIG. 9B is a cross section side view of the embodiment shown in FIG. 9A.

FIGS. 9A and 9B show a TMS package 900 affixed to a rubber mount 910. Rubber mount 910 combines the mount 810 and attachment patch 870 of the embodiment of FIGS. 8A and 8B into a single integral unit. Otherwise, the rubber mount 910 functions in the same way as described with respect to the embodiment of FIGS. 8A and 8B, including the discussed alternative embodiments.

In alternative embodiments (not shown), rubber mount 910 can be replaced with a mount made of a non-rubber material, or a rubber hybrid material.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An assembly for mounting an electronics package to a tire, comprising:
   an electronics package having a main portion;
   a mount,
      wherein the mount includes a peripheral flange;
   an attachment patch configured to be connected to the mount, the attachment patch having a central opening that extends completely through the attachment patch,
      wherein the central opening of the attachment patch is smaller than the peripheral flange of the mount, and
      wherein the attachment patch is configured to be directly affixed to a tire.

2. The assembly of claim 1, wherein the mount is integral with the main portion.

3. The assembly of claim 1, wherein the mount and the main portion are separable components, the mount including a threaded post and the main portion including a through-hole, sized to receive the threaded post, and wherein the assembly further includes a nut sized and shaped to fit on the threaded post.

4. The assembly of claim 1, wherein the mount and the main portion are separable components, and wherein the mount is a plurality of mounts,
   wherein each of the plurality of mounts includes a threaded post,
   wherein the main portion includes through-holes sized to receive the threaded posts;
   wherein the assembly further includes a plurality of nuts sized and shaped to fit on the threaded posts; and
   wherein the attachment patch includes a plurality of central openings smaller than the flanges of the mounts.

5. The assembly of claim 1, wherein the main portion and the mount are separable components,
   wherein the mount includes a protrusion; and
   the main portion includes a groove sized to receive the protrusion.

6. The assembly of claim 1, wherein the main portion and the mount are separable components,
   wherein the mount includes one or more snaps,
   wherein each snap includes one or more prongs; and
   wherein the main portion includes one or more recessions sized and shaped to receive the one or more snaps.

7. The assembly of claim 1, wherein the main portion and the mount are separable components, wherein the main portion includes two parallel linear slide rails, and wherein the mount includes two corresponding receiving rails sized and shaped to receive the parallel linear slide rails of the main portion in a locking engagement.

8. The assembly of claim 7, wherein the receiving rails are flexible.

9. The assembly of claim 1, wherein the main portion and the mount are separable components, wherein the mount includes an elongated post, and wherein the main portion includes a clamp sized and shaped to fit at least partially around the elongated post.

10. The assembly of claim 9, wherein the clamp includes two flexible arms sized and shaped to at least partially wrap around the elongated post.

11. The assembly of claim 1, wherein the central opening has an oval shape.

12. An assembly for attaching a tire-mounted sensor package to an innerliner of a tire, comprising:
   a tire-mounted sensor package containing electronics,
      wherein the tire-mounted sensor package includes a clamp having at least one arm;
   a mount having a bottom flange portion and an elongated post extending from the bottom flange portion, the bottom flange portion being wider than the elongated post,
      wherein the bottom flange portion is adapted to be affixed to an innerliner of a tire, and
      wherein the at least one arm of the clamp engages the elongated post of the mount to attach the tire-mounted sensor package to the mount.

13. The attachment mechanism of claim 12, wherein the elongated post of the mount has an upper flange portion that is wider than the elongated post.

14. The attachment mechanism of claim 12, wherein the bottom flange is adapted to be vulcanized on the tire innerliner.

15. The attachment mechanism of claim 12, wherein the bottom flange is adapted to be affixed to the tire innerliner using an adhesive.

16. The attachment mechanism of claim 12, wherein the tire-mounted sensor package is integral with the clamp.

17. A method of attaching an electronics package to a tire, comprising the steps of:
   locating an electronics package mount against a tire,
      wherein the electronics package mount has a lower flange;
   placing an attachment patch over the electronics package mount so that at least a contact portion of the attachment patch is in contact with the tire,
      wherein the attachment patch includes a central cutout portion that is smaller than the lower flange of the electronics package mount, the central cutout portion extending completely through the attachment patch;
   permanently affixing the contact portion of the attachment patch to the tire; and
   affixing an electronics package to the electronics package mount.

18. The method of claim 17, wherein the permanently affixing step includes cold curing the contact portion of the attachment patch to the tire.

19. The method of claim 17, wherein the central cutout portion has an oval shape.

20. The method of claim 17, wherein the permanently affixing step includes using an adhesive to secure the contact portion to the tire.

* * * * *